(12) United States Patent
Lai et al.

(10) Patent No.: US 11,474,289 B2
(45) Date of Patent: Oct. 18, 2022

(54) LIGHT-EMITTING DEVICE AND BACKLIGHT MODULE THEREOF

(71) Applicant: Lextar Electronics Corporation, Hsinchu (TW)

(72) Inventors: Lung-Kuan Lai, Hsinchu (TW); Jian-Chin Liang, Hsinchu (TW)

(73) Assignee: Lextar Electronics Corporation, Hsinchu (TW)

( * ) Notice: Subject to any disclaimer, the term of this patent is extended or adjusted under 35 U.S.C. 154(b) by 0 days.

(21) Appl. No.: 17/448,351

(22) Filed: Sep. 21, 2021

(65) Prior Publication Data
US 2022/0137280 A1 May 5, 2022

(30) Foreign Application Priority Data
Oct. 30, 2020 (CN) .......................... 202011191606.X

(51) Int. Cl.
F21V 8/00 (2006.01)
(52) U.S. Cl.
CPC ........... *G02B 6/0016* (2013.01); *G02B 6/004* (2013.01); *G02B 6/0036* (2013.01); *G02B 6/0073* (2013.01)
(58) Field of Classification Search
CPC ..... G02B 6/0016; G02B 6/0036; G02B 6/004
See application file for complete search history.

(56) References Cited

U.S. PATENT DOCUMENTS

| | | | | |
|---|---|---|---|---|
| 11,081,674 B2 * | 8/2021 | Sakaguchi | ........... | G02B 5/0242 |
| 2003/0053310 A1 | 3/2003 | Sommers | | |
| 2004/0022050 A1 * | 2/2004 | Yamashita | ........... | G02B 6/0065 362/615 |
| 2010/0177533 A1 * | 7/2010 | Griffiths | ............... | G02B 6/0068 362/605 |
| 2013/0050990 A1 * | 2/2013 | Shiraishi | .............. | G02B 6/0031 362/235 |
| 2013/0141937 A1 * | 6/2013 | Katsuta | .................. | G02B 6/005 362/606 |

(Continued)

FOREIGN PATENT DOCUMENTS

| | | |
|---|---|---|
| CN | 101583822 A | 11/2009 |
| CN | 102411166 A | 4/2012 |

(Continued)

*Primary Examiner* — Fatima N Farokhrooz
(74) *Attorney, Agent, or Firm* — CKC & Partners Co., LLC

(57) ABSTRACT

The present disclosure proposes a light-emitting device and a backlight module thereof. The light-emitting elements includes a substrate, a plurality of light-emitting elements, a light guide layer, a plurality of first light adjustment patterns, and a plurality of second light adjustment patterns. The light-emitting elements are disposed on the substrate. The light guide layer covers the substrate and the light-emitting elements. The first light adjustment patterns are disposed over or embedded within the light guide layer, and each of the first light adjustment patterns is located above each of the light-emitting elements, respectively. The second light adjustment patterns are disposed on or embedded in the light guide layer, and the second light adjustment patterns surround the corresponding first light adjustment patterns, respectively. The first light adjustment patterns and second light adjustment patterns have a refractive index smaller than that of the light guide layer.

20 Claims, 6 Drawing Sheets

(56) References Cited

U.S. PATENT DOCUMENTS

| | | | | |
|---|---|---|---|---|
| 2015/0117057 A1* | 4/2015 | Chen | ................... | G02B 6/0061 |
| | | | | 362/619 |
| 2019/0079240 A1* | 3/2019 | Hwang | ................. | G02B 6/005 |
| 2020/0117030 A1* | 4/2020 | Lee | ................... | G02F 1/133615 |
| 2020/0218005 A1* | 7/2020 | Ahn | ....................... | G02B 6/005 |
| 2020/0257044 A1* | 8/2020 | Rin | ...................... | G02B 6/0065 |
| 2021/0397049 A1* | 12/2021 | Allen | ............... | G02F 1/133605 |

FOREIGN PATENT DOCUMENTS

| | | | |
|---|---|---|---|
| JP | 2001007405 | A | 1/2001 |
| TW | 200527719 | A | 8/2005 |
| TW | 200725070 | A | 7/2007 |
| TW | 201106065 | A1 | 2/2011 |
| TW | 201351713 | A | 12/2013 |
| TW | I503581 | B | 10/2015 |
| TW | 201705577 | A | 2/2017 |

* cited by examiner

LIGHT-EMITTING DEVICE AND BACKLIGHT MODULE THEREOF

CROSS-REFERENCE TO RELATED APPLICATION

This application claims priority to China Application Serial Number 202011191606.X, filed Oct. 30, 2020, which is herein incorporated by reference in its entirety.

BACKGROUND

Field of Invention

The present disclosure relates to a light-emitting device and a backlight module thereof. More particularly, the present disclosure relates to a light-emitting device and a backlight module thereof with light adjustment patterns of specific, regular disposition and arrangement.

Description of Related Art

Because light-emitting diodes (LED) have the advantages of small sizes, high brightness, and low energy consumption, they have been widely implemented in light-emitting devices and backlight modules, gradually replacing traditional light sources in recent years.

The current LED backlight module mainly includes a plurality of light-emitting diode packages (LED PKG), located on a circuit substrate; in order to provide uniform backlight, the spacing between the light-emitting diode packages must be smaller than the optical distance (referred to as OD). The so-called optical distance herein refers to the distance from the surface of the circuit substrate or light-emitting diode package to the diffusion plate or optical layer. When the spacing between the light-emitting diodes is too large, it will result in dark regions appearing between the light-emitting diodes, causing non-uniformity of the overall backlight. Although the problems mentioned above can be improved by reducing the spacing between light-emitting diodes, however, the number of light-emitting diodes must be increased while reducing the distance, and thus resulting in cost increment.

In addition, the surface of a conventional circuit substrate contains a reflective surface, so that light will scatter when it hit the reflective surface, and the transmission path is shorter. Furthermore, LED is a point light source with strong directivity, so it is more difficult to achieve the uniform characteristics of surface light. Therefore, LED, in traditional, usually needs to be covered by an additional lens to expand the light emission angle of LED.

Therefore, how to enhance the light illumination efficiency and light-emitting effect of LED is an issue that still need to be resolved in the prior art.

SUMMARY

The present disclosure intends to resolve the problem of how to make the point light source of LED illuminate light uniformly without reducing the spacing between LEDs or increasing the number of LEDs. Some embodiments of the present disclosure propose a light-emitting device and its implementations for resolving the problems mentioned above, which utilize light adjustment patterns with a specific size sequence and arrangement rule to achieve the effects of uniform LED light illumination and compensating insufficient lighting in dark regions.

The present disclosure proposes a light-emitting device, comprising a substrate, a plurality of light-emitting elements, a light guide layer, a plurality of first light adjustment patterns, and a plurality of second light adjustment patterns. The light-emitting elements are disposed on the substrate. The light guide layer covers the substrate and the light-emitting elements. The first light adjustment patterns are on or embedded within the light guide layer, and each of the first light adjustment patterns is located immediately above each of the light-emitting elements, respectively. The second light adjustment patterns are disposed on or embedded in the light guide layer, and the second light adjustment patterns surround the corresponding first light adjustment patterns, respectively. The first light adjustment patterns and second light adjustment patterns have a refractive index smaller than that of the light guide layer.

In some embodiments, the plurality of first light adjustment patterns and the plurality of second light adjustment patterns can partially refract and partially reflect light beams emitted from the plurality of light-emitting elements.

In some embodiments, each of the first light adjustment patterns comprises a first mesh dot, and each of the second light adjustment patterns comprises a plurality of second mesh dots.

In some embodiments, an area of the first mesh dot is larger than an area of the light-emitting element, and an area of the first mesh dot is larger than an area of each of the second mesh dots.

In some embodiments, sizes of the second mesh dots are arranged from large to small along a direction away from the first mesh dot.

In some embodiments, densities of the second mesh dots are arranged from dense to sparse or from sparse to dense along a direction away from the first mesh dot.

In some embodiments, the second mesh dots have a center point, the second mesh dots being disposed between each of the first mesh dots and arranged symmetrically about the center point.

In some embodiments, the second mesh dots center about a center point of the first mesh dot as a center of circle, disposed around the center of circle concentrically.

In some embodiments, a total area of the first light adjustment patterns and the second light adjustment patterns is less than 50% of a total area of the substrate.

In some embodiments, the light guide layer has a rough upper surface.

In some embodiments, the light guide layer includes a plurality of scattering particles dispersed in the light guide layer.

In some embodiments, the light guide layer includes a plurality of anti-precipitation particles dispersed in the light guide layer.

In some embodiments, the substrate is a light-transmissive substrate.

In some embodiments, the light-transmissive substrate is a glass substrate.

In some embodiments, the light-emitting device further comprises a circuit layer disposed on the substrate, wherein the light-emitting elements are disposed on portions of the circuit layer.

In some embodiments, the light-emitting device further comprises a reflective layer, disposed on the circuit and covered by the light guide layer.

In some embodiments, a material of the reflective layer comprises aluminum and silicon dioxide, silver and silicon dioxide, gallium nitride, titanium dioxide, ceramic materials, Distributed Bragg reflectors or combinations thereof.

In some embodiments, the light-emitting elements are light-emitting diode devices.

In some embodiments, the light-emitting elements emit blue light.

The present disclosure proposes a backlight module, comprising the light-emitting devices as mentioned above.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or decreased for clarity of discussion.

DETAILED DESCRIPTION

Figure 1:
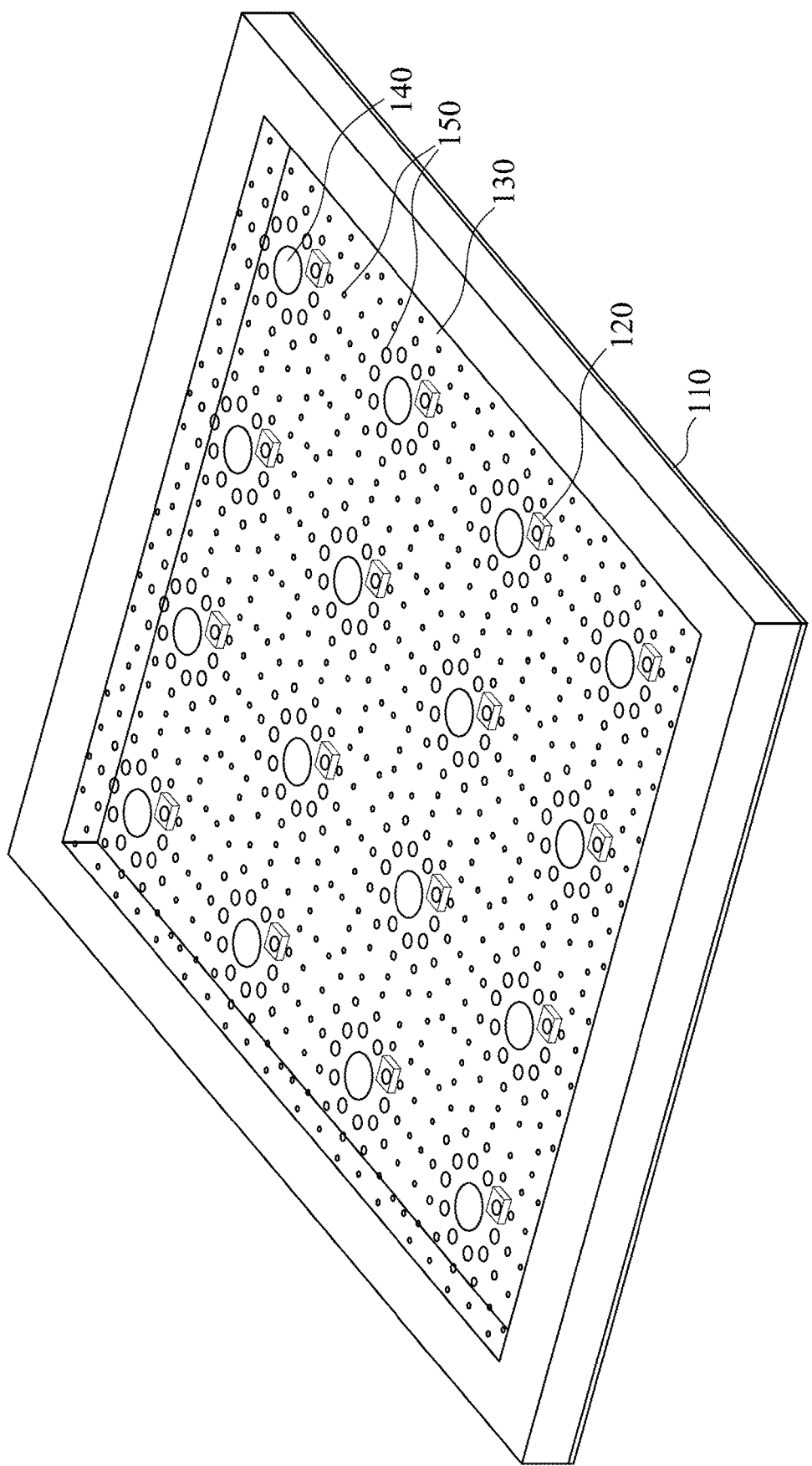
FIG. 1 depicts a perspective view of a light-emitting device according to an embodiment of the present disclosure.

The following disclosure provides many different embodiments, or examples, for implementing different features of the invention. Specific examples of components and arrangements are described below to simplify the present disclosure. These are, of course, merely examples and are not intended to be limiting. Other elements, values, operations, materials, configurations and the like, can also be contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Generally, the light-emitting device of the present disclosure can be used in any related devices with lighting or light-emitting function. The present disclosure enhances the light extraction efficiency of the light-emitting elements and controls the distance that light travels in the direction parallel to the substrate through a scattering optical design of the packaging glue, a mirror design of the substrate, roughening the packaging glue surface, a pattern design of the packaging glue surface, and an optical structure of the selected material.

In some embodiments of the present disclosure, a light-emitting device 100 with a uniform surface light source is provided. Referring to FIG. 1, FIG. 1 depicts a perspective view of a light-emitting device according to an embodiment of the present disclosure. As shown in FIG. 1, the light-emitting device 100 comprises a substrate 110, a plurality of light-emitting elements 120, a light guide layer 130, a plurality of first light adjustment patterns 140, and a plurality of second light adjustment patterns 150. The light-emitting device 100 may also comprise other elements, which will be described below. As shown in FIG. 1, a plurality of second light adjustment patterns 150 surround each first light adjustment pattern 140 in a concentric rule and arranged manner.

Figure 2:
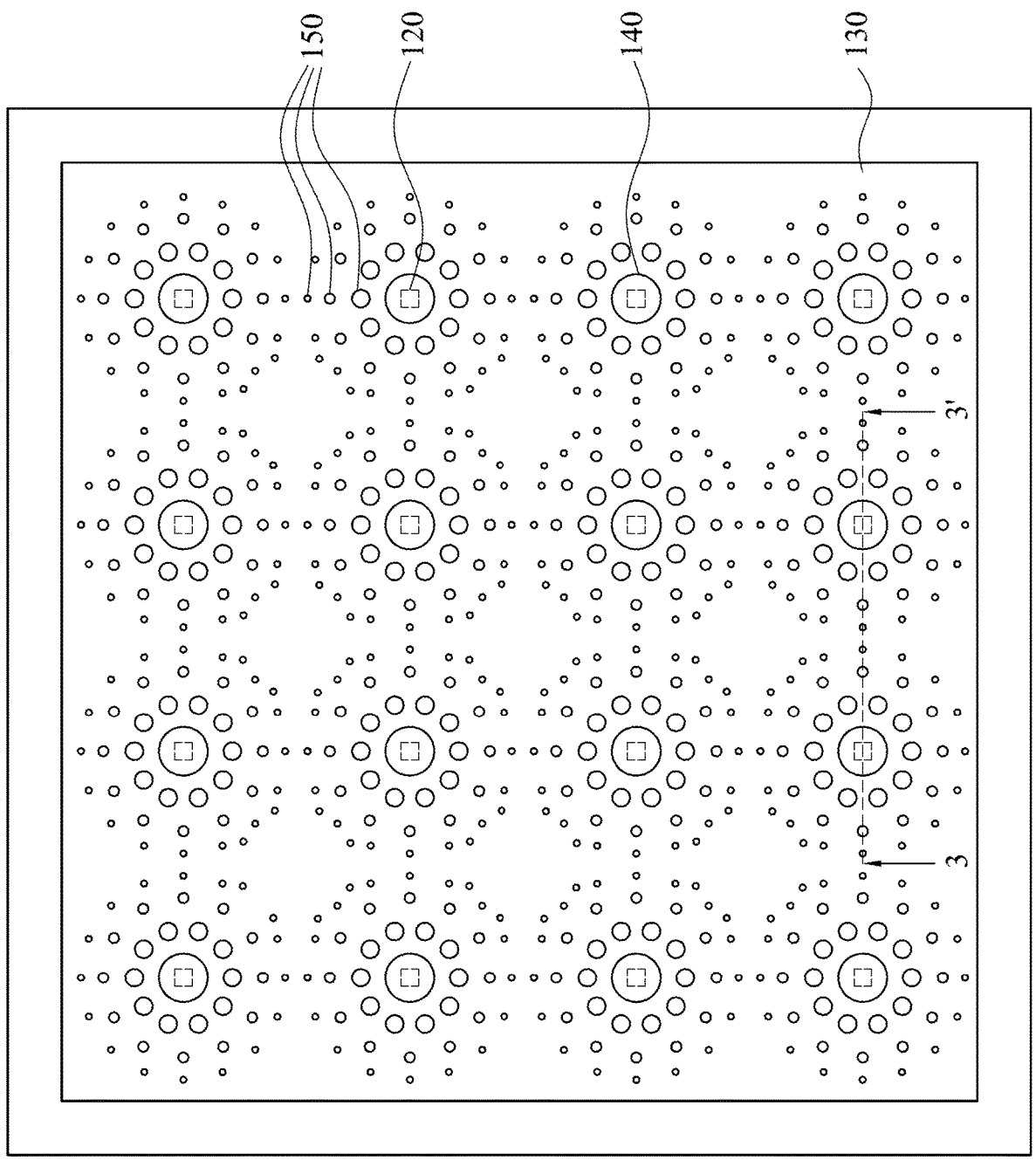
FIG. 2 depicts a top view of a light-emitting device according to another embodiment of the present disclosure.
Figure 3:
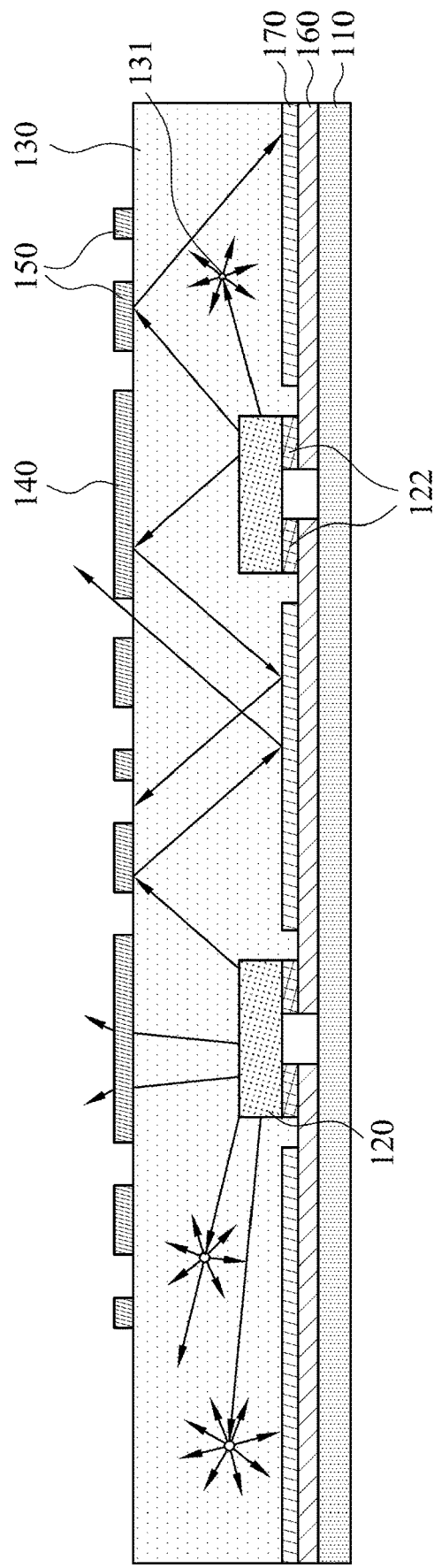
FIG. 3 depicts a cross-sectional view of the light-emitting device according to the section lines 3-3' in FIG. 2.

In another embodiment of the present disclosure, referring to FIGS. 2 and 3, and it is noted that the arrangement and size rules of the first light adjustment patterns 140 and the second light adjustment patterns 150 in FIG. 2 and FIG. 3 are merely exemplary, and the disclosure should not be limited as such. FIG. 2 depicts a top view of a light-emitting device according to another embodiment of the present disclosure, wherein substrate 110 is not depicted in FIG. 2. FIG. 3 depicts a cross-sectional view of the light-emitting device according to the section lines 3-3' in FIG. 2. The substrate 110 may include any suitable substrates. In an embodiment, the substrate 110 may be a transparent substrate or a non-transparent substrate. In an embodiment, the substrate 110 may be a rigid substrate or a flexible substrate. Therefore, the light-emitting device 100 can be implemented to a light-emitting module in the form of a highly curved surface backlight module. In some embodiments, the substance of the substrate 110 comprises but not limited to, a glass substrate, a sapphire substrate, a silicon substrate, a printed circuit board, a metal substrate, a ceramic substrate, an acrylic substrate, or a combination thereof.

These light-emitting elements 120 are disposed over the substrate 110. In some embodiments, the light-emitting elements 120 may be light-emitting diode devices emitting light of any wavelengths. For example, in an embodiment, the light-emitting elements 120 may be a light-emitting diode that emit blue light or a light-emitting diode that emit ultraviolet light. In an embodiment, the light-emitting elements 120 may be a light-emitting diode of any dimensions. In an embodiment, the light-emitting elements 120 may be a sub-millimeter light-emitting diode chip (Mini LED chip) or a micro light-emitting diode chip (Micro LED chip), but not be limited to such. The side length dimension of the "sub-millimeter light-emitting diode chip" may be about 100 microns, 150 microns, 200 microns, 250 microns, 300 microns, 350 microns, or 400 microns. The side length dimension of the "micro light-emitting diode chip" may be about 100 microns or less, for example, about 30 microns, 40 microns, 50 microns, 60 microns, 70 microns, 80 microns, or 90 microns. In addition, in an embodiment, the light-emitting elements 120 may be a light-emitting diode package (LED package) or a chip scale package LED (referred to as CSP LED). In an embodiment, the light-emitting elements 120 comprises two electrodes 122, where the material of the electrodes 122 comprises, but not limited to, copper, nickel, silver, gold, titanium, tungsten, cobalt, ruthenium, other metal elements, or alloys or combinations thereof.

The light guide layer 130 is disposed and covers the bottom faces of the light-emitting elements 120 and the substrate 110. In an embodiment, the material of the light guide layer 130 comprises a light-transmissive material, such as, but not limited to, silicone resin, epoxy resin, acrylic glue or a combination thereof. In addition, the first light adjustment patterns 140 and the second light adjustment patterns 150 have a refractive index smaller than that of the light guide layer 130. In an embodiment, the refractive index of the light guide layer 130 is between about 1.49 and about 1.62. For example, the refractive index of the light guide layer 130 may be 1.49, 1.50, 1.51, 1.52, 1.53, 1.54, 1.55, 1.56, 1.57, 1.58, 1.59, or any values between any two of these values. For example, the refractive index of silicone resin is about 1.4-1.5, the refractive index of epoxy resin is about 1.5-1.6, and the refractive index of acrylic glue is about 1.49. In an embodiment, the light guide layer 130 has a rough upper surface; it should be noted that the rough upper surface is not depicted in the drawings. More particularly, in an embodiment, after the light guide layer 130 is formed with a resin material layer, the upper surface of the resin material layer is roughened utilizing chemical etching or physical polishing to obtain a rough upper surface. In this way, when the light beams emitted by the light-emitting elements 120 passes through the rough upper surface, the rough upper surface can scatter light, making the light illumination of the light-emitting device 100 more uniform. In an embodiment, the rough upper surface has an arithmetic mean roughness (Ra) of 0.08-2 microns.

In some embodiments, the light guide layer 130 further comprises a plurality of scattering particles 131 and a plurality of anti-precipitation particles (not depicted). The scattering particles 131 are used to scatter the light beams from the light-emitting elements 120, and the anti-precipitation particles are used to help the scattering particles 131 to be suspended in the light guide layer 130, to prevent the doped scattering particles 131 from being precipitated in the light guide layer 130. In an embodiment, the material of the scatter particles 131 comprise, but not limited to, titanium dioxide, silicon dioxide or a combination thereof. In an embodiment, the dimension of the scattering particles 131 is between about 30 nm and about 90 nm, for example, may be about 30 nm, about 40 nm, about 50 nm, about 60 nm, about 70 nm, about 80 nm, about 90 nm, or any values between any two of these values. In an embodiment, the material of the anti-precipitation particles comprises, but not limited to, titanium dioxide, silicon dioxide, or a combination thereof. The dimension of the anti-precipitation particles is usually smaller than that of the scattering particles 131, with the dimension between about 5 nm and about 30 nm, for example, may be, but not limited to, about 5 nm, about 10 nm, about 15 nm, about 20 nm, about 25 nm, about 30 nm, or any value between any two of these values. In addition, in some embodiments, the materials of the scattering particles 131 and the anti-precipitation particles may both be silicon dioxide, and the dimensions of anti-precipitation particles will be finer in this case.

Figure 4:
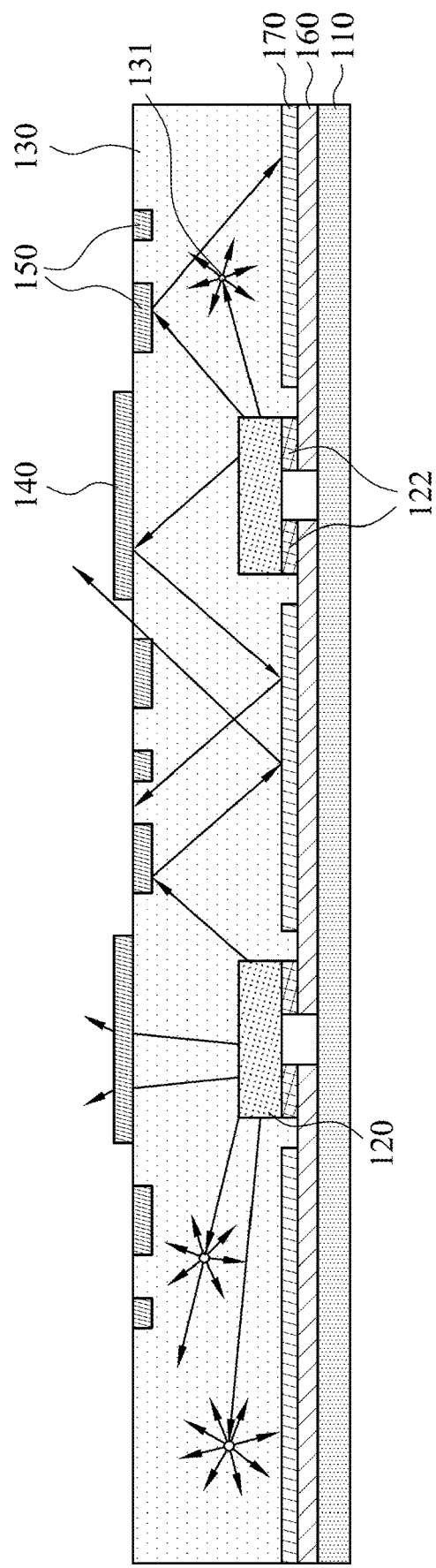
FIG. 4 depicts a cross-sectional view of a light-emitting device according to another embodiment of the present disclosure.

Then, referring to both FIG. 3 and FIG. 4, FIG. 3 depicts a cross-sectional view of a light-emitting device, according to the section lines 3-3' in FIG. 2, while FIG. 4 depicts a cross-sectional view of the light-emitting device, according to another embodiment of the present disclosure. It should be noted that, FIG. 3 and FIG. 4 are only two exemplary implementations, and the present disclosure should not be limited as such. As shown in FIG. 3, in some embodiments, a plurality of first light adjustment patterns 140 and a plurality of second light adjustment patterns 150 are disposed on the surface of the light guide layer 130. As shown in FIG. 4, in some embodiments, the plurality of first light adjustment patterns 140 are disposed on the surface of the light guide layer 130, and the plurality of second light adjustment patterns 150 are embedded in the light guide layer 130. In some embodiments, the lower surfaces of the first light adjustment patterns 140 are level with the upper surfaces of the second light adjustment patterns 150.

Referring to both FIG. 2 and FIG. 3 again, in some embodiments, the first light adjustment patterns 140 are, respectively, located immediately above the light-emitting elements 120, and the second light adjustment patterns 150, respectively, surround the corresponding first light adjustment patterns 140. In an embodiment, the first light adjustment patterns 140 and second light adjustment patterns 150 have a refractive index smaller than that of the light guide layer 130, for example, but not limited to, between about 1.34 to about 1.41. In an embodiment, the first light adjustment patterns 140 and the second light adjustment patterns 150 may be made of a material with a refractive index of the material between about 1.34 and about 1.41. For example, the refractive index of the material constructing the first light adjustment patterns 140 and the second light adjustment patterns 150 may be 1.34, 1.35, 1.36, 1.37, 1.38, 1.39, 1.40, 1.41, or any values between any two of these values. For example, the first light adjustment patterns 140 and the second light adjustment patterns 150 are UV glue with a refractive index of 1.38-1.4.

In some embodiments of the present disclosure, the difference in refractive index between the first and the second light adjustment patterns 140, 150 and the light guide layer 130 results in the first light adjustment patterns and the second light adjustment patterns partially refracting and partially mirror-reflecting the light beams emitted from the light-emitting elements 120.

In some embodiments of the present disclosure, a total area of the first light adjustment patterns 140 and the second light adjustment patterns 150 is less than 50% of a total area of the substrate 110. The transmittance of the first light adjustment patterns 140 and the second light adjustment patterns 150 may between about 40% and about 70%. For example, the transmittance of the first light adjustment patterns 140 and the second light adjustment patterns 150 may be 40%, 45%, 50%, 55%, 60%, 65%, 70% or any values between any two of these values. In an embodiment, the shapes of the first light adjustment patterns 140 and the second light adjustment patterns 150 comprise, but not limited to, a semicircle, a circle, a semi-ellipse, an ellipse, a triangle, a rectangle, a polygon, or combination thereof. In some embodiments of the present disclosure, when the shapes of the first light adjustment patterns 140 and the second light adjustment patterns 150 are circles, the diameters of the first light adjustment patterns 140 and the second light adjustment patterns 150 are between 0.1 mm and 1.5 mm. For example, the diameters of the first light adjustment patterns 140 and the second light adjustment patterns 150 may be 0.1 mm, 0.3 mm, 0.5 mm, 0.7 mm, 0.9 mm, 1.1 mm, 1.3 mm, 1.5 mm, or any values between any two of these values.

As shown in FIG. 3, in some embodiments of the present disclosure, the light-emitting elements 100 further comprises a circuit layer 160, and the circuit layer 160 is electrically connected to the electrode 122 of the light-emitting device 120. In some embodiments, these light-emitting elements 120 are disposed over portions of the circuit layer 160. In an embodiment, the process of forming the circuit layer 160 comprises, but not limited to, a sputtering process, an electroplating process, a copper foil process, an etching process, an injecting process, a burning process, or a combination thereof.

In some embodiments of the present disclosure, the light-emitting device 100 further comprises a reflective layer 170, and the reflective layer 170 is formed over the circuit layer 114. The light guide layer 130 is disposed over and covers the light-emitting elements 120, the circuit layer 160 and the reflective layer 170. In an embodiment, a material of the reflective layer 170 comprises, but not limited to, aluminum and silicon dioxide, silver and silicon dioxide, gallium nitride, titanium dioxide, ceramic materials, Distributed Bragg Reflector (DBR), aluminum, silver, glossy metal materials, or combinations thereof.

Figure 5:
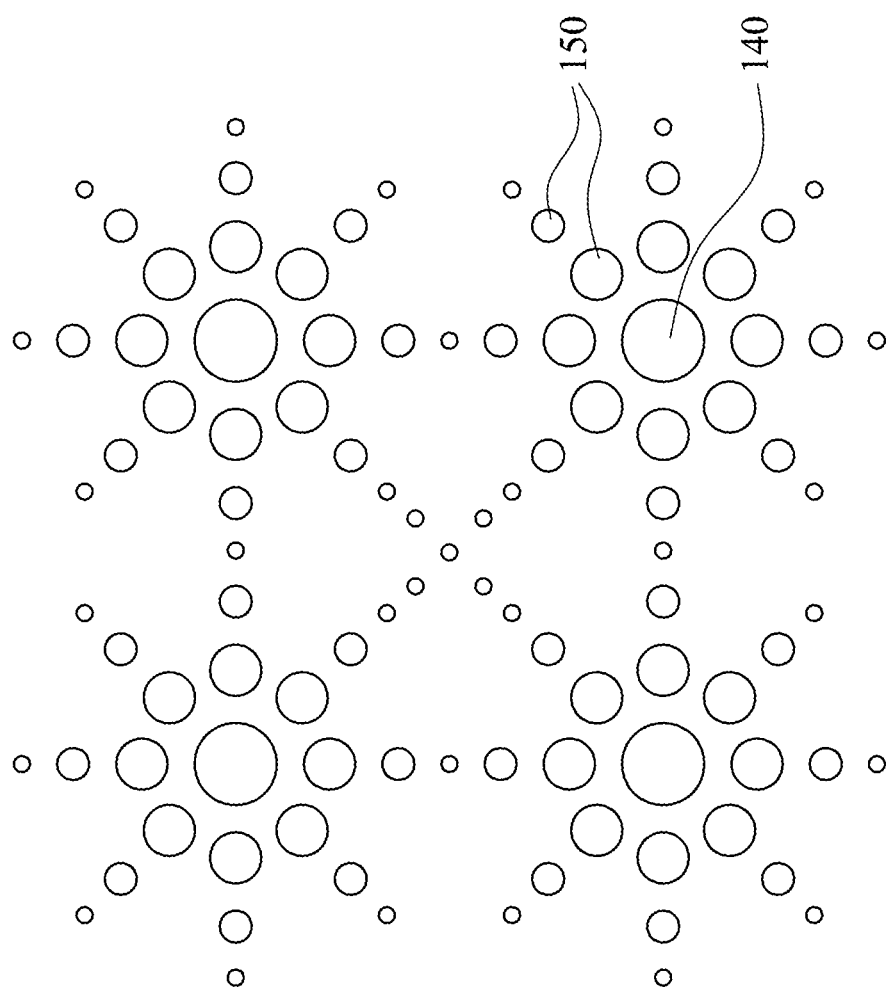
FIG. 5 depicts a schematic view of the light adjustment patterns of a light-emitting device according to another embodiment of the present disclosure.
Figure 6:
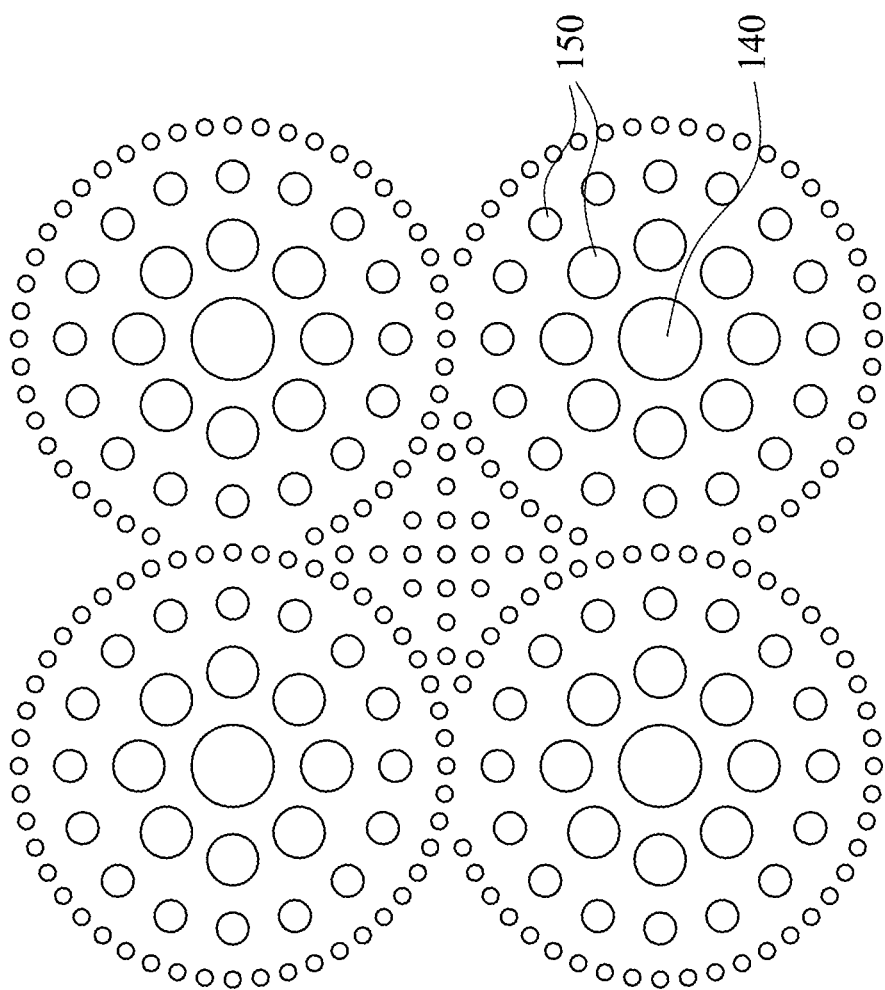
FIG. 6 depicts a schematic view of the light adjustment patterns of a light-emitting device according to yet another embodiment of the present disclosure.

Referring to FIG. 5 and FIG. 6. FIG. 5 is a schematic view depicting an example of a light adjustment pattern of a light-emitting device according to another embodiment of the present disclosure. FIG. 6 is a schematic view depicting an example of a light adjustment pattern of a light-emitting device according to yet another embodiment of the present disclosure. It should be noted that, the light adjustment patterns shown in FIG. 5 and FIG. 6 are two implementation aspects of the disclosure, and merely exemplary, and the disclosure should not be limited as such. As described above, the size, shape, spacing, or arrangement rules of the first light adjustment pattern 140 and the second light adjustment pattern 150 can be adjusted according to the light illumination condition of the light-emitting device. In some embodiments of the present disclosure, each of the first light adjustment patterns 140 comprises a first mesh dot, and each of the second light adjustment patterns 150 further comprises a plurality of second mesh dots. Referring to FIG. 3 at the same time, in an embodiment, an area of the first mesh dots is larger than an area of the light-emitting elements 120, and an area of the first mesh dots is also larger than an area of each second mesh dot. In some embodiments, sizes of the second mesh dots are arranged from large to small along a direction away from the first mesh dot. And, in an embodiment, densities of the second mesh dots are arranged from dense to sparse (as shown in FIG. 5) or from sparse to dense (as shown in FIG. 6) along a direction away from the first mesh dot. In an embodiment, the second mesh dots have a center point, and the second dots being disposed between each of the first mesh dots and arranged symmetrically about the center point. In some embodiments, the second mesh dots take a center point of the first mesh dot as a center of circle, and the second mesh dots are arranged around the center of circle concentrically.

Regarding the light-emitting device 100 described in the present disclosure, the light guide layer 130, the first light adjustment pattern 140, and the second light adjustment pattern 150 are disposed to increase the transmission distance of the light-emitted by the light-emitting elements 120 in the light guide layer 130, and make the light output of the light-emitting device 100 more uniform. Furthermore; the upper surface of the reflective layer 170 and the rough light guide layer 130 can be used to make the light illumination more uniform. Accordingly, it is possible to maintain the brightness of the light illumination and increase the uniformity of the light illumination without reducing the spacing between the light-emitting elements 120.

In conclusion, the art disclosed in the present disclosure mainly uses materials with a lower refractive index than the packaging glue (such as the light guide layer 130) as light adjustment patterns (such as the first light adjustment pattern 140 and the second light adjustment pattern 150) to be disposed on or embedded in the packaging glue. Then, a reflective material is further coated to a bottom of the light guide layer to serve as a reflective layer (i.e., reflective layer 170). Through the combination of the above elements, the spacing between the light-emitting elements can be increased to about 12 mm or more. In this way, the light extraction efficiency of the light-emitting elements can be enhanced, the distance that the light travels in the direction parallel to the substrate can be controlled, and the uniformity of the surface light source can be maintained or even enhanced.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should realize that, although the present disclosure has been disclosed in various embodiments as above, it is not intended to limit the present disclosure, any person skilled in the art can make various changes and modifications without departing from the spirit and scope of this disclosure. Therefore, the protection scope of this disclosure should be subject to the scope defined by the appended claims.

What is claimed is:

1. A light-emitting device, comprising:
   a substrate;
   a plurality of light-emitting elements, disposed on the substrate;
   a light guide layer, covering the substrate and the plurality of light-emitting elements;
   a plurality of first light adjustment patterns, disposed on the light guide layer or embedded within the light guide layer, wherein each of the plurality of first light adjustment patterns is respectively located above each of the plurality of light-emitting elements; and
   a plurality of second light adjustment patterns, disposed on the light guide layer or embedded in the light guide layer, wherein the plurality of second light adjustment patterns respectively surrounds the corresponding first light adjustment patterns,
   wherein the plurality of first light adjustment patterns and the plurality of second light adjustment patterns have a refractive index smaller than that of the light guide layer; and
   wherein each of the plurality of first light adjustment patterns and the plurality of second light adjustment patterns is configured to partially refract and partially reflect at least one light beam emitted from at least one of the plurality of light-emitting elements, and the plurality of first light adjustment patterns and the plurality of second light adjustment patterns consist of the same material.

2. The light-emitting device of claim 1, wherein each of the plurality of first light adjustment patterns comprises a first mesh dot, and each of the plurality of second light adjustment patterns comprises a plurality of second mesh dots.

3. The light-emitting device of claim 1, wherein a total area of the plurality of first light adjustment patterns and the plurality of second light adjustment patterns is less than 50% of a total area of the substrate.

4. The light-emitting device of claim 1, wherein the light guide layer has a rough upper surface.

5. The light-emitting device of claim 1, wherein the light guide layer includes a plurality of scattering particles dispersed in the light guide layer.

6. The light-emitting device of claim 1, wherein the light guide layer includes a plurality of anti-precipitation particles dispersed in the light guide layer.

7. The light-emitting device of claim 1, wherein the substrate is a light-transmissive substrate.

8. The light-emitting device of claim 1, further comprising a circuit layer disposed over the substrate, wherein the plurality of light-emitting elements are disposed on portions of the circuit layer.

9. The light-emitting device of claim 1, wherein the plurality of light-emitting elements are light-emitting diode elements.

10. A backlight module, comprising the light-emitting device of claim 1.

11. The light-emitting device of claim 1, wherein a top surface of each of the plurality of first light adjustment patterns is level with a top surface of each of the plurality of second light adjustment patterns.

12. The light-emitting device of claim 1, wherein a bottom surface of each of the plurality of first light adjustment patterns is level with a top surface of each of the plurality of second light adjustment patterns.

13. The light-emitting device of claim 2, wherein an area of the first mesh dot is larger than an area of each of the plurality of light-emitting elements, and the area of the first mesh dot is larger than an area of each of the plurality of second mesh dots.

14. The light-emitting device of claim 13, wherein sizes of the plurality of second mesh dots are arranged from large to small along a direction away from the first mesh dot.

15. The light-emitting device of claim 13, wherein densities of the plurality of second mesh dots are arranged from dense to sparse or from sparse to dense along a direction away from the first mesh dot.

16. The light-emitting device of claim 13, wherein the plurality of second mesh dots have a center point, the plurality of second dots being disposed between each of the first mesh dots and arranged symmetrically about the center point.

17. The light-emitting device of claim 13, wherein the plurality of second mesh dots take a center point of the first mesh dot as a center of circle, and are arranged around the center of circle concentrically.

18. The light-emitting device of claim 7, wherein the light-transmissive substrate is a glass substrate.

19. The light-emitting device of claim 8, further comprising a reflective layer, disposed on the circuit and covered by the light guide layer.

20. The light-emitting device of claim 19, wherein a material of the reflective layer comprises aluminum and silicon dioxide, silver and silicon dioxide, gallium nitride, titanium dioxide, ceramic materials, Distributed Bragg Reflectors or a combination thereof.

* * * * *